US010889494B2

(12) United States Patent
Urban et al.

(10) Patent No.: US 10,889,494 B2
(45) Date of Patent: Jan. 12, 2021

(54) GRAPHENE OXIDE/METAL NANOCRYSTAL MULTILAMINATES THE ATOMIC LIMIT FOR SAFE, SELECTIVE HYDROGEN STORAGE

(71) Applicant: The Regents of the University of California, Oakland, CA (US)

(72) Inventors: Jeffrey J. Urban, Emeryville, CA (US); Eun Seon Cho, Daejeon (KR); Anne M. Ruminski, Belmont, CA (US); Shaul Aloni, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 344 days.

(21) Appl. No.: 15/893,263

(22) Filed: Feb. 9, 2018

(65) Prior Publication Data

US 2018/0186630 A1    Jul. 5, 2018

Related U.S. Application Data

(63) Continuation of application No. PCT/US2016/045167, filed on Aug. 2, 2016.
(Continued)

(51) Int. Cl.
*C01B 3/00* (2006.01)
*B82Y 30/00* (2011.01)
(Continued)

(52) U.S. Cl.
CPC .............. *C01B 3/0078* (2013.01); *B01J 20/04* (2013.01); *B01J 20/20* (2013.01);
(Continued)

(58) Field of Classification Search
CPC .. B01J 20/3021; C01B 3/0078; C01B 3/0021; C01B 3/0026; B82Y 30/00; Y02E 60/325
(Continued)

(56) References Cited

U.S. PATENT DOCUMENTS

| 2012/0195823 A1* | 8/2012 | Moon .................... B82Y 40/00 |
| | | 423/648.1 |
| 2018/0185814 A1 | 7/2018 | Urban et al. |
| 2018/0195205 A1 | 7/2018 | Urban et al. |

FOREIGN PATENT DOCUMENTS

| CN | 102910581 A | 10/2012 |
| CN | 102910581 A * | 2/2013 |

OTHER PUBLICATIONS

Wang, CN 102910581 A, machine translation, Feb. 6, 2013, entire machine translation (Year: 2013).*

(Continued)

*Primary Examiner* — Humera N. Sheikh
*Assistant Examiner* — Katherine A Christy

(57) ABSTRACT

Various embodiments of the invention describe an environmentally stable, and exceptionally dense hydrogen storage (6.5 wt % and 0.105 kg $H_2$/L in the total composite, 7.56 wt % in Mg) using atomically thin and gas-selective reduced graphene oxide sheets as encapsulants. Other approaches to protecting reactive materials involve energy intensive introduction of considerable amounts of inactive, protective matrix which compromises energy density. However, these multilaminates are able to deliver exceptionally dense hydrogen storage far-exceeding 2020 DOE target metrics for gravimetric capacity (5.5 wt %), and ultimate full-fleet volumetric targets (0.070 kg $H_2$/L) for fuel cell electric vehicles. Methods of stabilizing reactive nanocrystalline metals in zero-valency also has wide-ranging applications for batteries, catalysis, encapsulants, and energetic materials.

8 Claims, 15 Drawing Sheets

Related U.S. Application Data

(60) Provisional application No. 62/203,198, filed on Aug. 10, 2015.

(51) Int. Cl.
| | |
|---|---|
| *C01B 32/184* | (2017.01) |
| *C01B 32/194* | (2017.01) |
| *B01J 20/04* | (2006.01) |
| *B01J 20/20* | (2006.01) |
| *B01J 20/28* | (2006.01) |
| *B01J 20/30* | (2006.01) |
| *B82Y 40/00* | (2011.01) |

(52) U.S. Cl.
CPC ..... *B01J 20/28007* (2013.01); *B01J 20/3021* (2013.01); *B01J 20/3085* (2013.01); *B82Y 30/00* (2013.01); *C01B 3/0021* (2013.01); *C01B 3/0026* (2013.01); *C01B 32/184* (2017.08); *C01B 32/194* (2017.08); *B82Y 40/00* (2013.01); *Y02E 60/32* (2013.01)

(58) Field of Classification Search
USPC .......................................................... 428/408
See application file for complete search history.

(56) References Cited

OTHER PUBLICATIONS

Junkaew, "Mg-Based Nano-layered Thin Films for Hydrogen Storage," Dec. 2013, Texas A&M University, URL: <https://oaktrust.library.tamu.edu/handle/1969.1/151777?show=full>, entire dissertation (Year: 2013).*
International Search Report and Written Opinion for International Application No. PCT/US16/45167 dated Oct. 27, 2016.
Schuth et al., "Light metal hydrides and complex hydrides for hydrogen storage." Chemical Communications, Issue 10, pp. 2249-2258, Sep. 21, 2004.
Wang et al. "Bimetallic NiCo Functional Graphene: An Efficient Catalyst for Hydrogen-Storage Properties of MgH2." Chemistry—An Asian Journal, vol. 9, No. 9, pp. 2576-2583, Jul. 8, 2014.
Li et al., "Mg(OH)2@reduced graphene oxide composite for removal of dyes from water." Journal of Materials Chemistry, vol. 21, No. 36, pp. 13765-13768, Aug. 11, 2011.
Cho et al., "Graphene oxide/metal nanocrystal multilaminates as the atomic limit for safe and selective hydrogen storage." Nature Communications, Feb. 23, 2016.
Cho et. al., "Graphene oxide/metal nanocrystal multilaminates as the atomic limit for safe and selective hydrogen storage." Nature Communications, 7:10804 | DOI: 10.1038/ncomms10804 |www.nature.com/naturecommunications, Feb. 23, 2016.
Shao et. al., "Nanotechnology in Mg-based materials for hydrogen storage." Nano Energy, vol. 1, pp. 590-601, May 31, 2012.
Jeon et. al., "Air-stable magnesium nanocomposites provide rapid and high-capacity hydrogen storage without using heavy-metal catalysts." Nature Materials, vol. 10, pp. 286-290, Mar. 13, 2011.
Agueny-Zinsou et. al., "Hydrogen in magnesium: new perspectives toward functional stores." Energy and Environmental Science, vol. 3., No. 5, pp. 497-676, Feb. 25, 2010.
Yang et. al., "High capacity hydrogen storage materials: attributes for automotive applications and techniques for materials discovery." Chemical Society Reviews, vol. 39, pp. 656-675, 2010.
Joshi et. al., "Precise and Ultrafast Molecular Sieving Through Graphene Oxide Membranes." Science, vol. 343, No. 6172, pp. 752-754, Feb. 14, 2014.
Kim et. al., "Selective Gas Transport Through Few-Layered Graphene and Graphene Oxide Membranes." Science, vol. 342, No. 6154, pp. 91-95, Oct. 4, 2013.
Li et. al., "Ultrathin, Molecular-Sieving Graphene Oxide Membranes for Selective Hydrogen Separation." Science, vol. 342, No. 6154, pp. 95-98, Oct. 4, 2013.
Adelhelm et. al., "The impact of carbon materials on the hydrogen storage properties of light metal hydrides." Journal of Materials Chemistry, vol. 21, pp. 2417-2427, 2011.
Yao et. al., "Metallic and Carbon Nanotube-Catalyzed Coupling of Hydrogenation in Magnesium." Journal of the American Chemical Society, vol. 129, No. 50, pp. 15650-15654, Nov. 23, 2007.
Liu et. al., "Tailoring the hydrogen storage properties of Li4BN3H10 by confinement into highly ordered nanoporous carbon ." Journal of Material Chemistry A, vol. 1, pp. 3926-3931, Jan. 30, 2013.
Jung et. al., "Ultrafast room-temperature reduction of graphene oxide to graphene with excellent dispersibility by lithium naphthalenide." Carbon, vol. 63, pp. 165-174, Nov. 2013.
Reike, "Preparation of Organometallic Compounds from Highly Reactive Metal Powders." Science, vol. 246, No. 4935, pp. 1260-1264, Dec. 8, 1989.
Ruminski et. al., "Synergistic enhancement of hydrogen storage and air stability via Mg nanocrystal-polymer interfacial interactions." Energy and Environmental Science, vol. 6, No. 11, pp. 3267-3271, Sep. 13, 2013.
Norberg et. al., "Size-Dependent Hydrogen Storage Properties of Mg Nanocrystals Prepared from Solution." Journal of the American Chemical Society, vol. 133, No. 28, pp. 10679-10681, Jun. 14, 2011.
Denis et. al., "Hydrogen sorption properties of magnesium particles decorated with metallic nanoparticles as catalyst." Journal of Alloys and Compounds, vol. 476, No. 1-2, pp. 152-159, May 12, 2009.
Du et. al., "Catalytic Effects of Subsurface Carbon in the Chemisorption of Hydrogen on a Mg(0001) Surface: an Ab-initio Study." Journal of Physical Chemistry B, vol. 110, No. 4, pp. 1814-1819, Jan. 6, 2006.
Yao et. al., "Mg-Based Nanocomposites with High Capacity and Fast Kinetics for Hydrogen Storage." Journal of Physical Chemistry B, vol. 110, No. 24, pp. 11697-11703, May 26, 2006.

* cited by examiner

GRAPHENE OXIDE/METAL NANOCRYSTAL MULTILAMINATES THE ATOMIC LIMIT FOR SAFE, SELECTIVE HYDROGEN STORAGE

CROSS REFERENCE TO RELATED APPLICATIONS

This application claims priority to International Application No. PCT/US2016/045167, filed Aug. 2, 2016, which claims priority to U.S. Provisional Patent Application No. 62/203,198, filed Aug. 10, 2015, all of which are herein incorporated by reference.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

The present invention relates to the field of hydrogen storage.

Related Art

The established environmental impacts resulting from fossil fuels have stimulated urgent efforts to decarbonize our fuel sources. Hydrogen is the ultimate carbon-free energy carrier—it possesses the highest energy density amongst chemical fuels, and water is the sole combustion product. While commitment to hydrogen fuels is growing for automotive applications, safe, dense, solid-state hydrogen storage remains a formidable scientific challenge. In principle, metal hydrides offer ample reversible storage capacity, and do not require cryogens or exceedingly high pressures for operation. However, despite these advantages, hydrides have been largely abandoned due to oxidative instability and sluggish kinetics.

While major car manufacturers have made commitments to hydrogen as a "fuel of the future", hydrogen storage for FCEVs (fuel cell electric vehicles) currently relies on compressed gas tanks. These are unable to meet long-term storage targets and severely compromise on-board occupancy. Solid-state hydrogen storage in metal hydrides is one of the few materials capable of providing sufficient storage density required to meet these long-term targets. However, simultaneously meeting gravimetric, volumetric, thermodynamic, and kinetic requirements has proven challenging due to the strong binding enthalpies for the metal hydride bonds, long diffusion path lengths, and oxidative instability of zero-valent metals. While nanostructuring has been shown to optimize binding enthalpies, synthesis and oxidative stabilization of metallic nanocrystals remains a challenge. Protection strategies often involve embedding these crystals in dense matrices, which add considerable "dead" mass to the composite, in turn decreasing gravimetric and volumetric density. Thus, while metal hydrides show the most promise for non-cryogenic applications, it remains true that no single material has met all of these essential criteria.

BRIEF DESCRIPTION OF THE DRAWINGS

The foregoing aspects and others will be readily appreciated by the skilled artisan from the following description of illustrative embodiments when read in conjunction with the accompanying drawings.

FIGS. 1A-1D illustrate a mixed dimensional reduced graphene oxide (rGO)-magnesium (Mg) nanocrystal nanolaminates rGO-Mg for light, stable, and energetically-dense hydrogen storage. FIG. 1A illustrates a picture of rGO-Mg in air (upper left) and illustrations depicting the structure of the rGO-Mg nanolaminates; randomly distributed rGO-Mg laminates in 3-D (lower left) and rGO-Mg laminate structure (right), FIG. 1B illustrates TEM images of rGO-Mg showing the high density of Mg nanocrystals with no visible aggregates. The upper inset is a high-resolution image and the lower inset is diffraction pattern where the hexagonal dots are matched to Mg (100), corresponding to a d-spacing of 2.778 Å. FIG. 1C illustrates XRD spectra of rGO-Mg after synthesis and after 3 months in air with indices of peaks (The bottom bars represent a XRD pattern of hexagonal Mg (hcp), tetragonal $MgH_2$, hexagonal $Mg(OH)_2$, cubic MgO), FIG. 1D illustrates EELS spectrum of a representative rGO-Mg composite flake suspended over a hole in the TEM support grid. The spectrum shows a dominant Mg L-edge peak and a carbon K-edge peak indicating a large quantity of Mg crystals within the rGO support.

FIG. 7A illustrates hydrogen absorption/desorption (at 200° C. and 15 bar $H_2$/300° C. and 0 bar) for the prepared rGO-Mg multilaminates. FIG. 7B illustrates hydrogen absorption/desorption cycling of rGO-Mg multilaminates that were first exposed to air overnight. The first 5 cycles were performed at 250° C. and 15 bar $H_2$/350° C. and 0 bar, and the additional 20 cycles at 200° C. and 15 bar $H_2$/300° C. and 0 bar. FIG. 7C illustrates XRD spectra of rGO-Mg after absorption/desorption (XRD patterns of Mg (squares), $MgH_2$ (triangles), MgO (inverted triangles)).

FIG. 14A illustrates XANES spectra of GO, rGO-Mg after synthesis and after cycling at carbon K-edge, FIG. 14B illustrates Raman spectra of GO, rGO-Mg after synthesis and after $H_2$ cycling, and FIG. 14C illustrates the 2D peak region.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Various embodiments of the invention describe an environmentally stable, and exceptionally dense hydrogen storage material utilizing atomically thin and gas-selective reduced graphene oxide (rGO) sheets as encapsulants (6.5 wt % and 0.105 kg $H_2$/L in the total composite, 7.56 wt % in Mg). Other approaches to protecting reactive materials involve energy intensive introduction of considerable amounts of inactive, protective matrix which compromises energy density.

Various embodiments of the invention describe that novel multilaminates are able to deliver exceptionally dense hydrogen storage far-exceeding 2020 Department of Energy (DOE) target metrics for gravimetric capacity (5.5 wt %), and ultimate full-fleet volumetric targets (0.070 kg $H_2$/L) for fuel cell electric vehicles. Methods of the invention for stabilizing reactive nanocrystalline metals in zero-valency also have wide-ranging applications for batteries, catalysis, encapsulants, and energetic materials.

Various embodiments of the invention describe mixed dimensional reduced graphene oxide/metallic nanocrystal hybrids rGO-Mg as the optimum materials platform for solid-state hydrogen storage. After the first report of the preparation of individual graphene sheets in 2004, the graphene sheets unique optoelectronic properties attracted great attention. Graphene oxide (GO), formerly considered just a precursor for the synthesis of graphene, has begun to find independent applications in water purification and gas separations due to its hydrophilicity, chemical structure, and atomistic pore size diameters. For example, GO membranes have recently been explored as materials for crucial gas separation challenges. Interestingly, these studies have shown extreme permeability for $H_2$ relative to other atmospheric gases such as $O_2$ and $N_2$, thus providing a potential avenue for use as an atomically thin, selective barrier layer for sensitive hydrogen storage materials. Furthermore, related studies have shown that reduction of GO to form reduced graphene oxide (rGO) further results in a dramatic decrease in water permeance while maintaining desirable gas permeability characteristics.

Figure 1B:
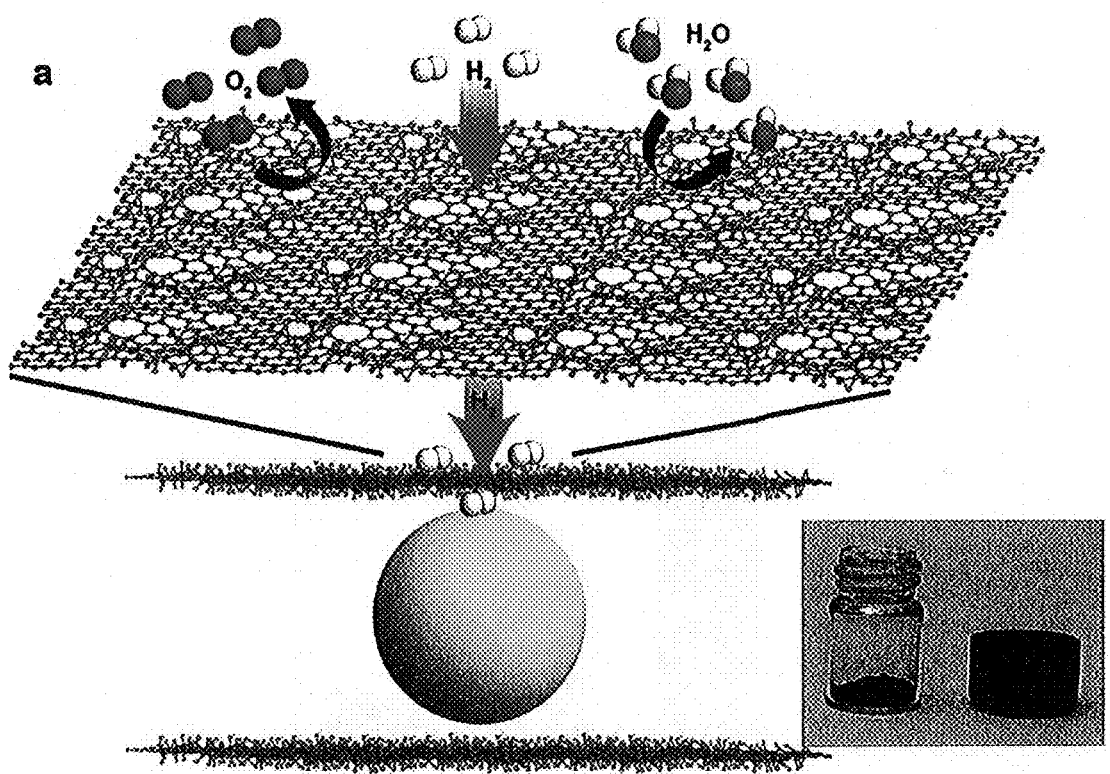
Figure 1B:
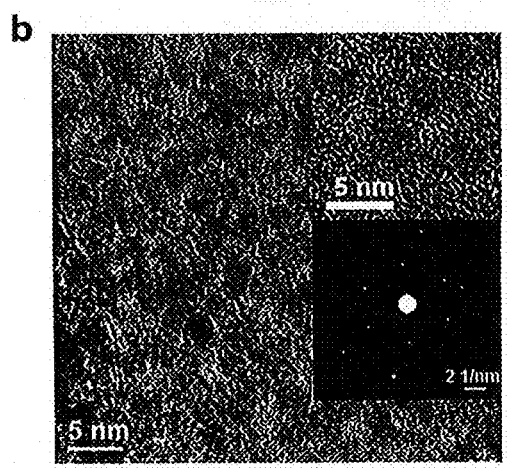
Figure 1C:
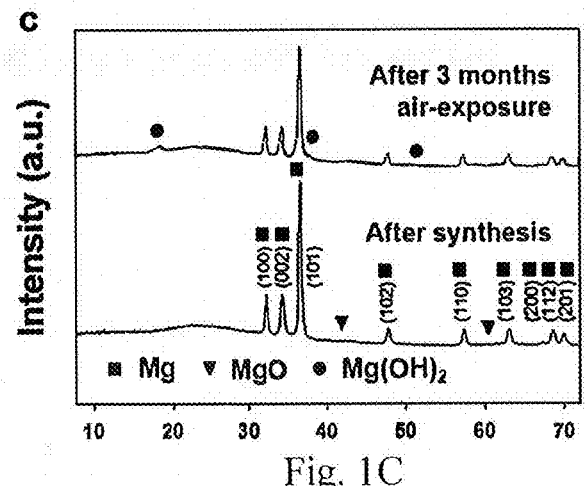
Figure 1D:
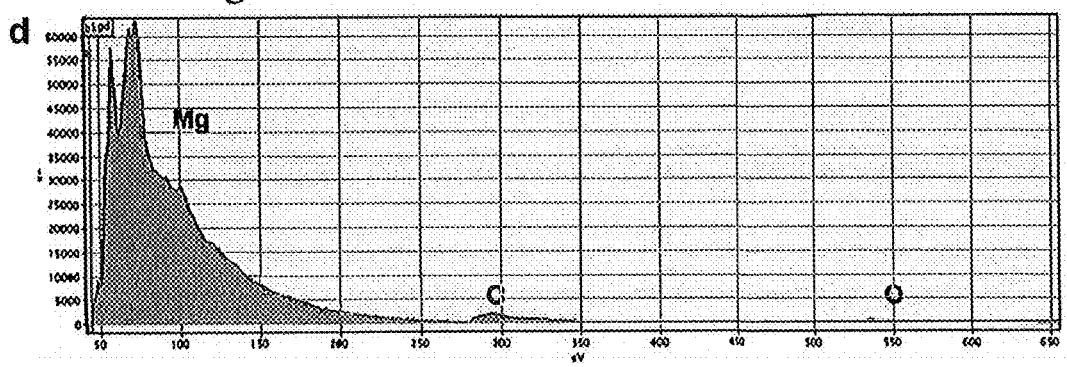

FIGS. 1A-1D illustrate a mixed dimensional rGO-magnesium (Mg) nanocrystal laminates for light, stable, and energetically-dense hydrogen storage. FIG. 1A illustrates a picture of rGO-Mg in air (upper left) and illustrations depicting the structure of the rGO-Mg nanolaminates; randomly distributed rGO-Mg laminates in 3-D (lower left) and rGO-Mg laminate structure (right), FIG. 1B illustrates TEM images of rGO-Mg showing the high density of Mg nanocrystals with no visible aggregates. The upper inset is a high-resolution image and the lower inset is diffraction pattern where the hexagonal dots are matched to Mg (100), corresponding to a d-spacing of 2.778 Å (JCPDS 04-0770). (More TEM images and analysis are provided in the subsequent Information), FIG. IC illustrates XRD spectra of rGO-Mg after synthesis and after 3 months in air with indices of peaks (JCPDS 04-0770) (The bottom bars represent a XRD pattern of hexagonal Mg (hcp), tetragonal $MgH_2$, hexagonal $Mg(OH)_2$, cubic MgO), FIG. 1D illustrates EELS spectrum of a representative rGO-Mg composite flake suspended over a hole in the TEM support grid. The spectrum shows a dominant Mg L-edge peak and a carbon K-edge peak indicating a large quantity of Mg nanocrystals within the rGO support.

In one embodiment, mixed dimensional laminates of 2D reduced graphene oxide filled with Mg nanocrystals for hydrogen storage applications were prepared (see FIG. 1A). In this composite, rGO serves as the atomic limit for barrier layer materials in functional composites, providing the least possible amount of inactive mass for the greatest performance in selective permeability and kinetic enhancement (theoretically up to 98 wt % of Mg in the composite). As illustrated in FIG. 1A, rGO sheets function as a protective layer preventing Mg nanocrystal oxidation, while still allowing hydrogen to easily penetrate, diffuse along the layers, and be released. Moreover, beyond the crucial gas barrier behavior, we demonstrate that the rGO layers add functionality to the laminates by reducing the activation energies associated with hydrogen absorption and desorption, key kinetically limiting steps for traditional metal hydride systems.

Several studies have shown that carbon-based materials, such as carbon fibers, nanotubes, and graphite, exhibit a beneficial catalytic effect on the kinetics and cyclability of hydrogen absorption and desorption of metal hydrides. While there are other reports using graphitic materials in composites for Li-ion battery applications, to our knowledge there have been no reports that take advantage of both the unique catalytic properties and high variability in gas permeability of rGO to synergistically yield new functionality. For the nanolaminate system presented, rGO layers are ideal encapsulating materials: they provide atomically thin structure to minimize added mass, catalytically enhanced rate-limiting hydrogen absorption/desorption events, and protective barriers to prevent degradation of Mg nanocrystals.

The majority of reported composites consisting of metals and carbon materials are prepared via ball-milling or solidification with either polymers or carbon frameworks. However, ball-milled materials are notoriously polydisperse, which introduces corresponding inhomogeneity in properties. Moreover, such energy intensive processes can intrinsically introduce unwanted morphological disruptions and chemical inhomogeneities, all of which detract from performance.

By contrast, we have developed a direct, one-pot, co-reduction, thus simultaneously forming both pristine, monodisperse nanocrystals and the desired rGO without energy-intensive processing or ligand chemistries. Observing that current approaches for reduction of GO and reduction of metal precursors to form Mg nanocrystals both rely on similar methodologies, we synthesized rGO-Mg nanocomposites via a facile solution-based co-reduction method. In this process, the $Mg^{2+}$ precursor is stabilized by graphene oxide and both of them are reduced by lithium naphthalenide.

Figure 2:
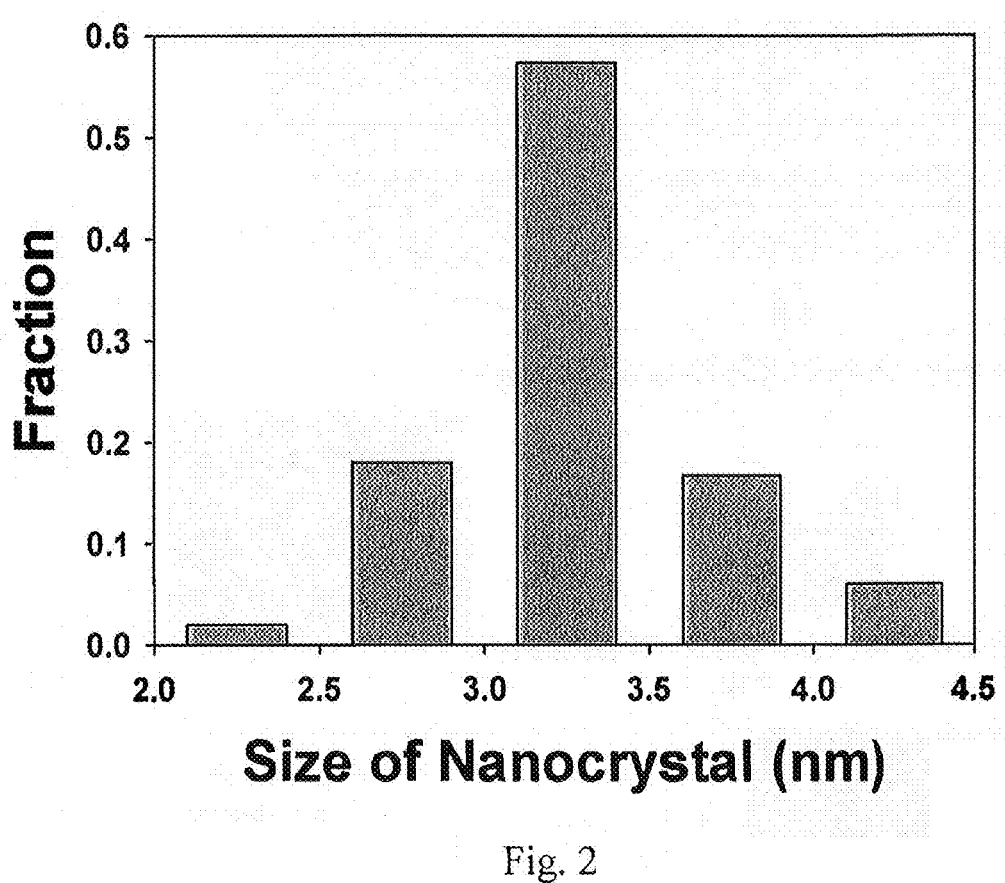
FIG. 2 illustrates a histogram of Mg nanocrystal size distribution (3.26 nm diameter (±0.87 nm)) as determined by TEM.

The synthesized rGO-Mg was characterized via TEM and XRD, as shown in FIGS. 1B, 1C. FIG. 2 illustrates a histogram of Mg nanocrystal size distribution (3.26 nm diameter (±0.87 nm)) as determined by TEM. The Mg nanocrystals were 3.26 nm diameter presenting fine monodisperse nanocrystals, compared to other metal hydrides prepared by conventional method such as ball-milling. While Scherrer analysis of the XRD peak width indicates larger crystallite size of ~15 nm (see Table 1), multiple TEM images over dozens of samples consistently show 3.26 nm (±0.87 nm) sized Mg nanocrystals. The XRD result however implies the possible existence of either a binomial distribution or agglomeration of nanocrystals. The area of the peaks in EELS measurements (Mg>>>C>O) indicated a high density of Mg within the composite (see FIG. 1D). Additionally, despite containing a highly dense packing of Mg nanocrystals, the nanolaminates were observed to be remarkably environmentally-stable.

Figure 3:
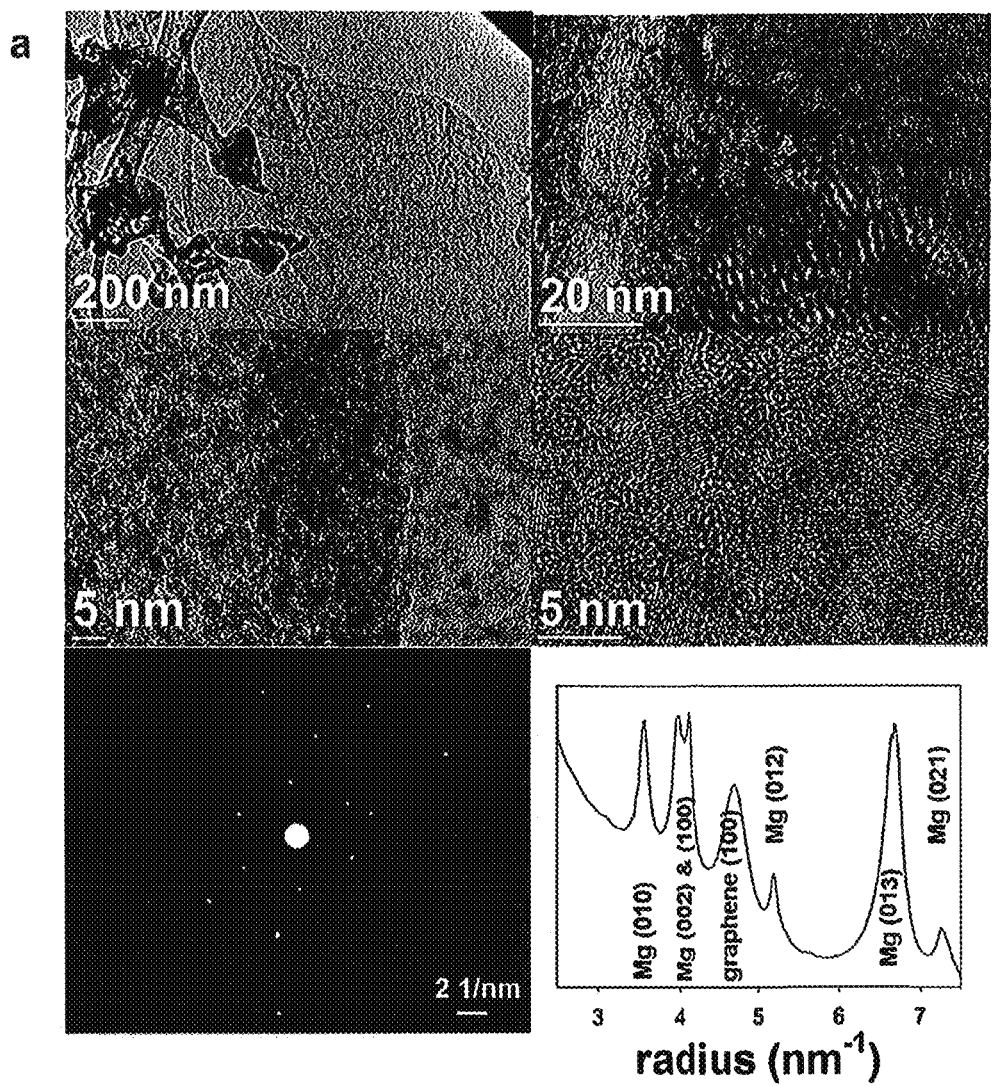
FIG. 3 illustrates TEM images of rGO-Mg after synthesis. The diffraction patterns were analyzed via Image J Radial Profile Angle software, which produces a plot of normalized integrated radial intensities; the corresponding plot is shown in the lower right hand panel.

FIG. 3 illustrates TEM images of rGO-Mg after synthesis. The diffraction patterns were analyzed via Image J Radial Profile Angle software, which produces a plot of normalized integrated radial intensities; the corresponding plot is shown here in the lower right hand panel.

Figure 4:
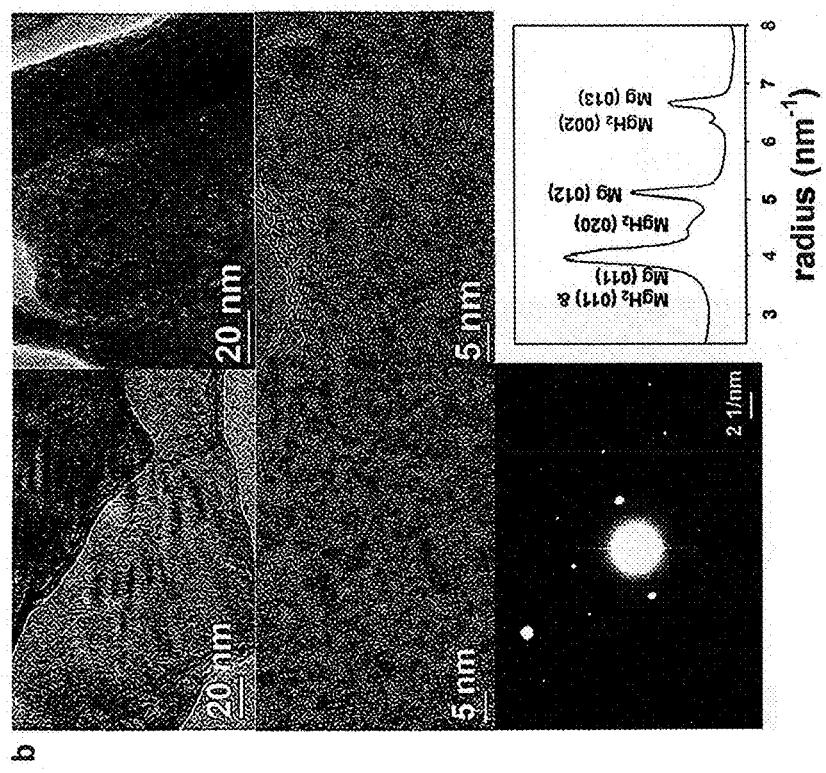
FIG. 4 illustrates TEM images of rGO-Mg after hydrogen cycling. The diffraction patterns were analyzed via Image J Radial Profile Angle software, which produces a plot of normalized integrated radial intensities; the corresponding plot is also shown in the lower right hand panel.

FIG. 4 illustrates TEM images of rGO-Mg after hydrogen cycling. The diffraction patterns were analyzed via Image J Radial Profile Angle software, which produces a plot of normalized integrated radial intensities; the corresponding plot is shown here in the lower right hand panel.

Figure 5:
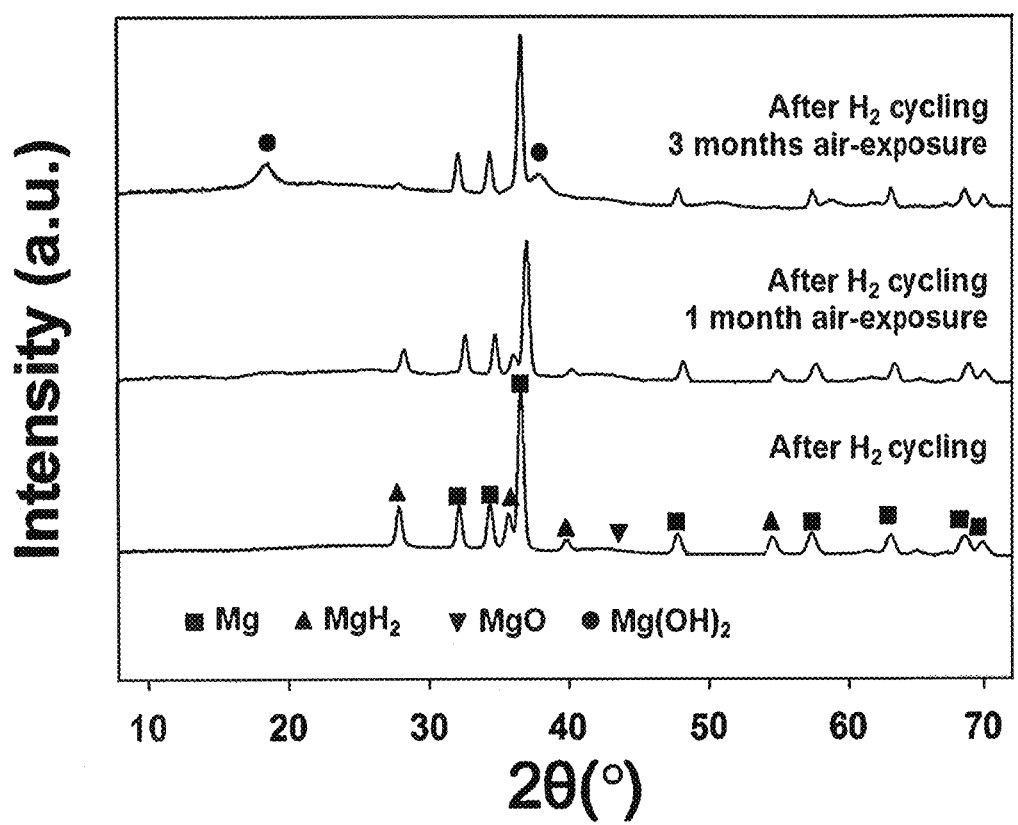
FIG. 5 illustrates XRD spectra of the composite after cycling (5 cycles) with partial desorption and subsequent air exposure (XRD pattern of Mg (squares), $MgH_2$ (triangles). $Mg(OH)_2$ (circles), MgO (inverted triangles)).

FIG. 5 illustrates XRD spectra of the composite after cycling (5 cycles) with partial desorption and subsequent air exposure (XRD pattern of Mg (squares), $MgH_2$ (triangles), $Mg(OH)_2$ (circles), MgO (inverted triangles)).

Figure 6:
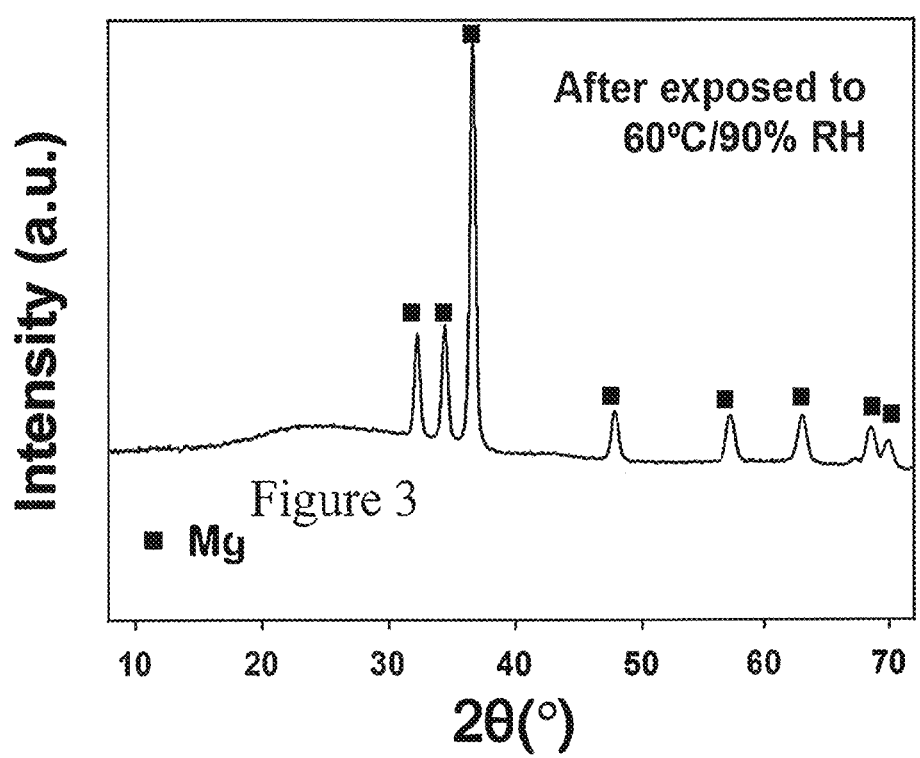
FIG. 6 illustrates XRD spectra of rGO-Mg after exposed to 60° C./90% RH in the environmental chamber with indices of peaks (XRD pattern of Mg (squares)).

FIG. 6 illustrates XRD spectra of rGO-Mg after exposed to 60° C./90% RH in the environmental chamber with indices of peaks (XRD pattern of Mg (squares)).

To investigate the limits of stability, rGO-Mg samples were exposed to air and characterized over time by XRD and TEM (see FIG. 1C and FIG. 3); incredibly even after three months of air exposure, the nanocrystals remained almost entirely zero-valent crystalline Mg, while showing invasion of only a low intensity $Mg(OH)_2$ peak (see FIG. 5 and an additional corrosion test result in FIG. 6). Moreover, to show the reliability offered by this approach, we completely exposed the sample to air, and then demonstrated hydrogen cycling. This is not possible with any other hydride technology with comparable storage density. En some samples at least 50% of the Mg nanocrystals are zero-valent crystalline Mg. In some samples at least 50% to 90% of the Mg nanocrystals are zero-valent crystalline Mg. In some samples at least 90% to 99% of the Mg nanocrystals are zero-valent crystalline Mg.

The rGO-Mg composite was placed in the environmental chamber with 60° C.—the upper limit in the range of ambient operating temperature of FCEV by DOE—and 90% of relative humidity for 3 days to verify its safety under environmental exposure, followed by XRD measurement. Remarkably, the Mg crystalline structure was well-maintained without oxidation due to the rGO encapsulation layers.

Figure 7A:
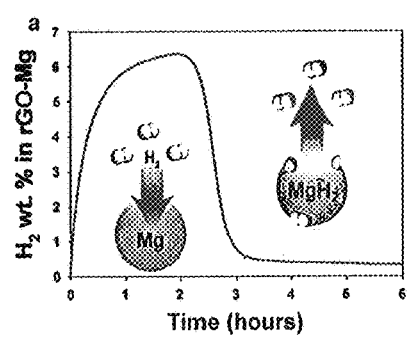
FIGS. 7A-7C illustrate hydrogen absorption/desorption characterization of rGO-Mg multilaminates.
Figure 7B:
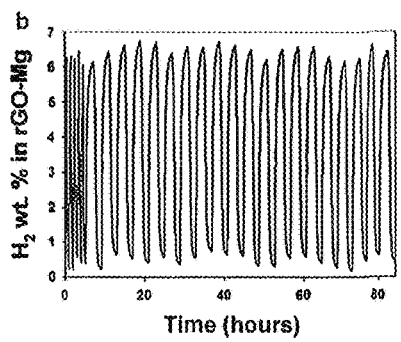
Figure 7C:
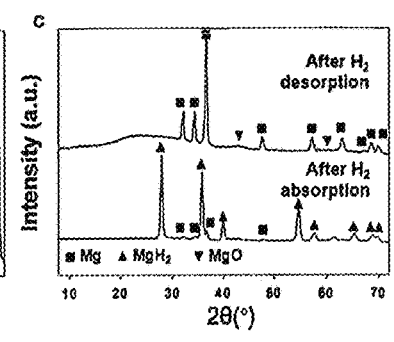

FIGS. 7A-7C illustrate hydrogen absorption/desorption characterization of rGO-Mg multilaminates. FIG. 7A illustrates hydrogen absorption/desorption (at 200° C. and 15 bar $H_2$/300° C. and 0 bar) for the prepared rGO-Mg multi laminates. FIG. 7B illustrates hydrogen absorption/desorption cycling of rGO-Mg multilaminates that were first exposed to air overnight. The first 5 cycles were performed at 250° C. and 15 bar $H_2$/350° C. and 0 bar, and the additional 20 cycles at 200° C. and 15 bar $H_2$/300° C. and 0 bar. FIG. 7C illustrates XRD spectra of rGO-Mg after absorption/desorption (XRD patterns of Mg (squares), $MgH_2$ (triangles), MgO (inverted triangles)).

Hydrogen absorption and desorption characteristics of the rGO-Mg composite were tested using a Sieverts PCT-Pro instrument at 15 bar $H_2$ and 0 bar, respectively, as shown in FIG. 7A. Hydrogen uptake was immediate, and formation of $MgH_2$ was confirmed by XRD (FIG. 7C) and electron diffraction (see FIG. 4). The hydrogen absorption capacity of the composite was 6.5 wt % and 0.105 kg $H_2$/L in the total composite, far exceeding the desired 2020 DOE gravimetric target (5.5 wt %) and the ultimate full-fleet volumetric target (0.070 kg $H_2$/L) for FCEV applications. This corresponds to 7.56 wt % $H_2$ in Mg nanocrystals, which is 99.5% of the theoretical value (7.6 wt %). Given the atomically thin nature of the encapsulation, these nanocomposites achieve denser packing of metal nanocrystals than is possible by any competing approach, leading to optimized storage density.

Figure 8:
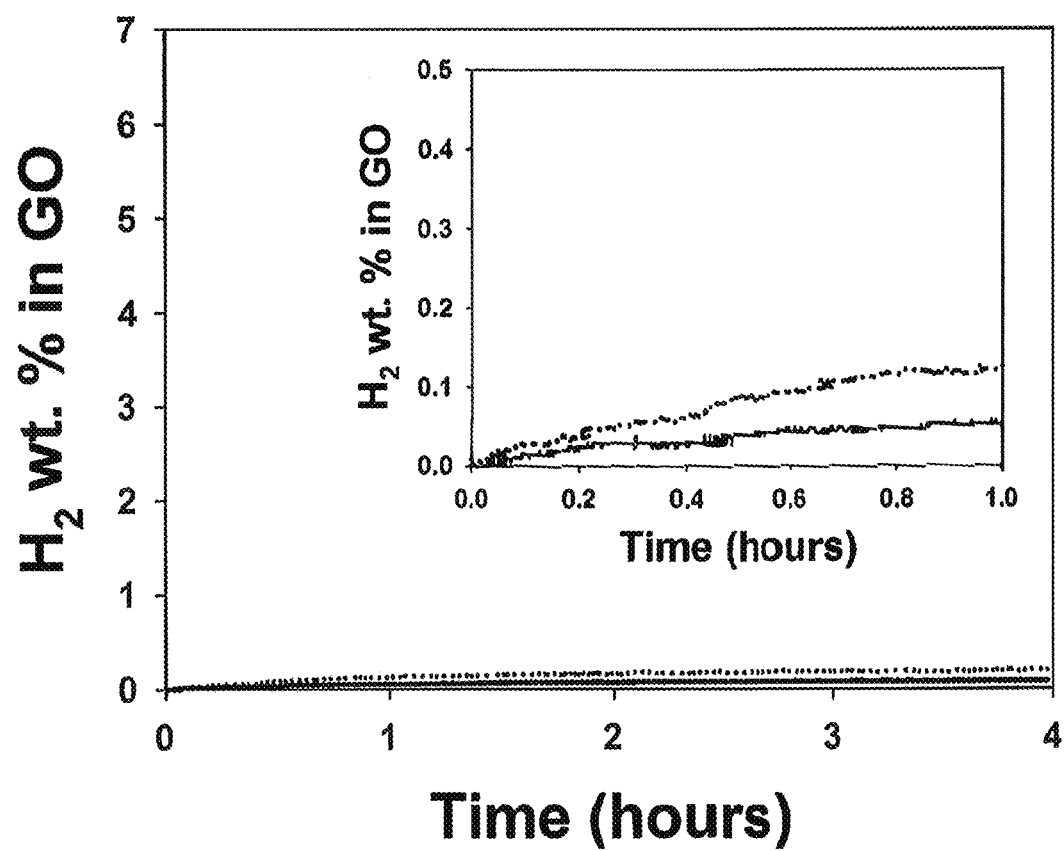
FIG. 8 illustrates hydrogen absorption of GO: Black dots and black lines represent hydrogen absorption at 200° C. and 250° C., respectively, for 4 hours at 15 bar $H_2$. (The inset shows a magnified version for the first hour of absorption.)

FIG. 8 illustrates hydrogen absorption of GO: Black dots and black lines represent hydrogen absorption at 200° C. and 250° C., respectively, for 4 hours at 15 bar $H_2$. (The inset shows a magnified version for the first hour of absorption.)

Figure 9A:
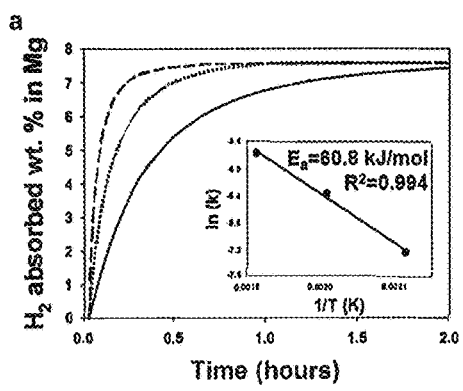
FIG. 9A illustrates hydrogen absorption at three different temperatures (black line: 200° C., circles: 225° C., dash: 250° C.) at 15 bar $H_2$.
Figure 9B:
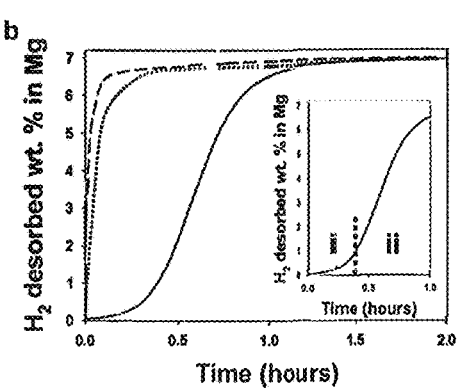
FIG. 9B illustrates hydrogen desorption at three different temperatures (black line: 300° C., circles: 325° C., dash: 350° C.) at 0 bar. The inset shows two different desorption regions at 300° C.

FIG. 9A illustrates hydrogen absorption at three different temperatures (black line: 200° C., circles: 225° C., dash: 250° C.) at 15 bar $H_2$, FIG. 9B hydrogen desorption at three different temperatures (black line: 300° C., circles: 325° C., dash: 350° C.) at 0 bar. The inset shows two different desorption regions at 300° C.

Figure 10A:
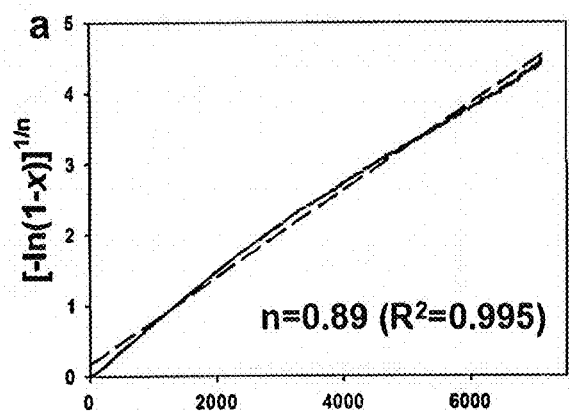
FIGS. 10A-10F illustrate JMA fitting for all absorption and desorption measurements with "best" n values, absorption at FIG. 10A 200° C., FIG. 10B 225° C., FIG. 10C 250° C., and desorption at FIG. 10D 300° C. (the inset shows the fitting of the initial 1 wt % desorption), FIG. 10E 325° C., and FIG. 10F 350° C.
Figure 10B:
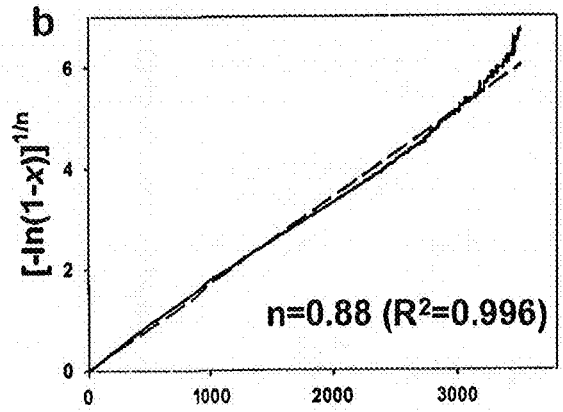
Figure 10C:
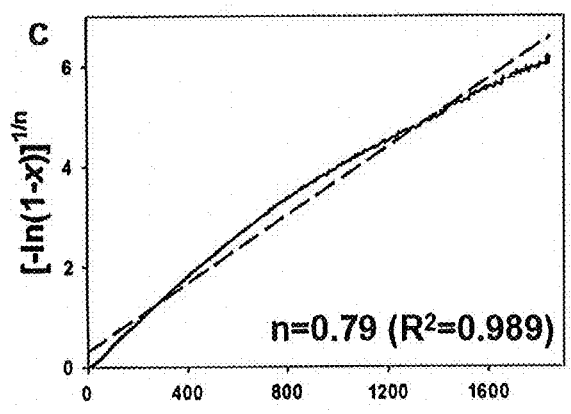

FIGS. 10A-10F illustrate JMA fitting for all absorption and desorption measurements with "best" n values, absorption at FIG. 10A 200° C., FIG. 10B 225° C., FIG. 10C 250°

Figure 10D:
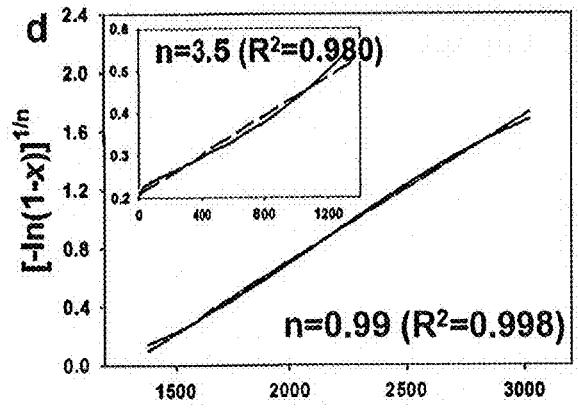
Figure 10E:
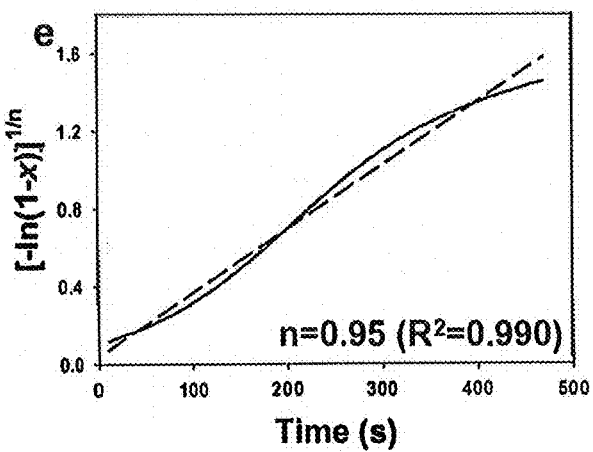
Figure 10F:
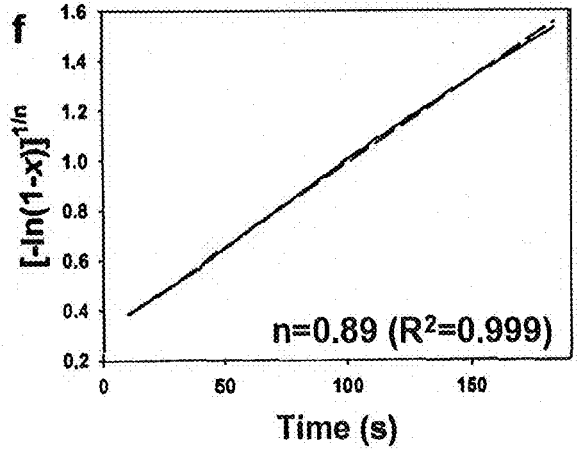

C., and desorption at FIG. 10D 300° C. (the inset shows the fitting of the initial 1 wt % desorption), FIG. 10E 325° C., FIG. 10F 350° C.

Figure 11A:
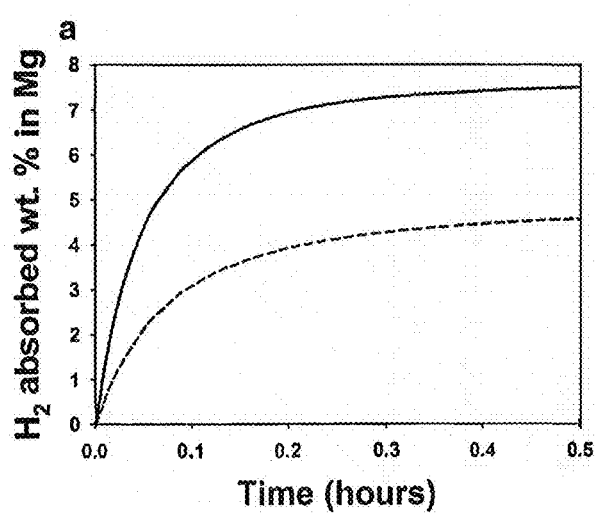
FIG. 11A illustrates hydrogen absorption at 250° C. and 15 bar $H_2$, FIG. 11B hydrogen desorption at 300° C. and 0 bar for rGO-Mg (solid) and Mg-PMMA (dashed).
Figure 11B:
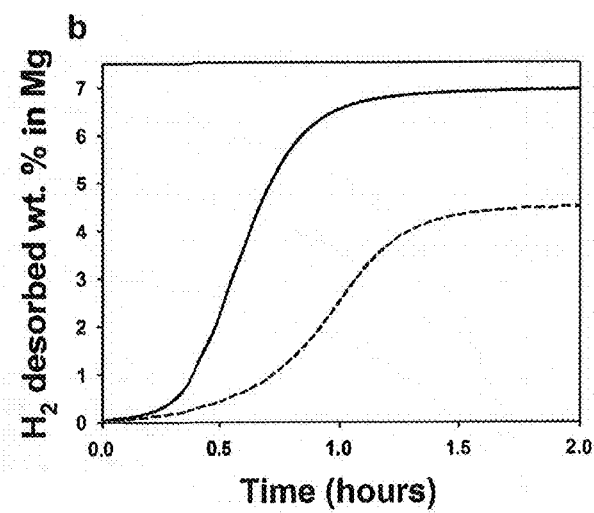

FIG. 11A illustrates hydrogen absorption at 250° C. and 15 bar $H_2$, FIG. 11B hydrogen desorption at 300° C. and 0 bar for rGO-Mg (solid) and Mg-PMMA (dashed).

Figure 12A:
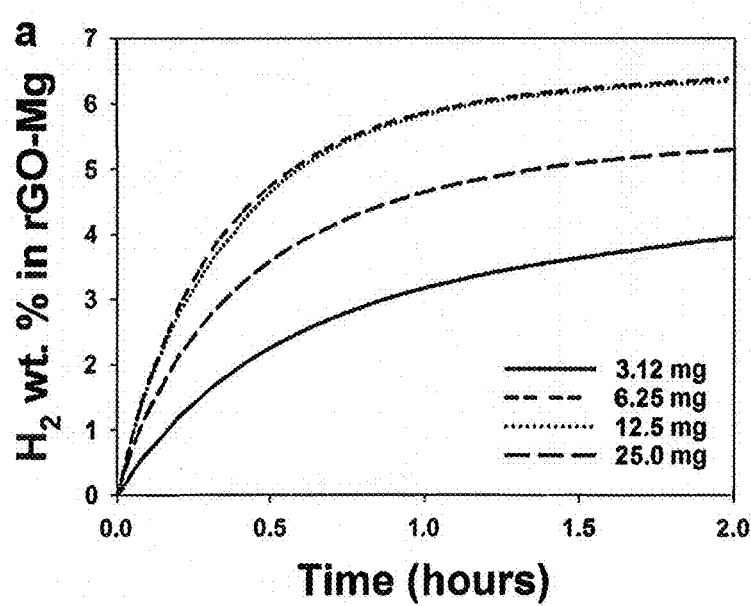
FIG. 12A illustrates hydrogen absorption at 200° C. and 15 bar $H_2$ with different amount of GO, as indicated (the original amount of GO discussed is 6.25 mg, as described in Methods).
Figure 12B:
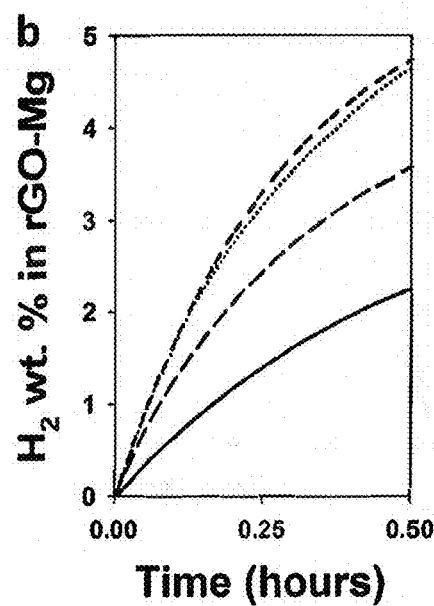
FIG. 12B illustrates the first 0.5 hour of the $H_2$ absorption traces are magnified, better demonstrating the clear difference in kinetics.

FIG. 12A illustrates hydrogen absorption at 200° C. and 15 bar $H_2$ with different amount of GO, as indicated (the original amount of GO discussed is 6.25 mg, as described in Methods). FIG. 12B illustrates the first 0.5 hour of the $H_2$ absorption traces are magnified, better demonstrating the clear difference in kinetics.

Figure 9C:
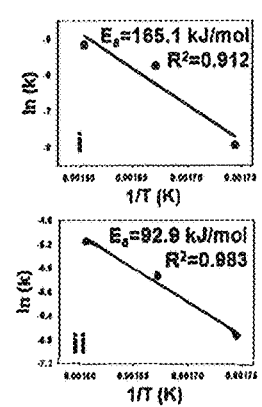
FIG. 9C illustrates different activation energies were obtained: 165.1 kJ/mol ($R_2$=0.912) and 92.9 kJ/mol ($R^2$=0.983) respectively.

Furthermore, hydrogen also readily desorbed up to 6.12 wt % in the composite, thus demonstrating excellent reversibility. To verify that the hydrogen absorption was not caused by the presence of GO in the composite, control studies using only GO were conducted and exhibited minimal (<0.2 wt % in GO) absorption at 200° C. and 250° C. (see FIG. 8). This is a negligible contribution, given that the amount of GO in the multilaminates is <2 wt % overall. To analyze the kinetics, the activation energy ($E_a$) for hydrogen, absorption/desorption was determined from measurements at three different temperatures, fitting the result with the Johnson-Mehl-Avrami model (see FIGS. 8-10 and Table 2). The $E_a$ values were 60.8 kJ/mol and 92.9 kJ/mol for absorption and desorption, respectively, consistent with 1-dimensional nucleation and growth as shown previously. Incredibly, these kinetics are comparable to transition metal-catalyzed bulk metal-hydride systems, and the overall capacity and kinetics greatly surpass the best environmentally robust samples made up to date.

We ascribe the performance of our composite to the unique features of this multilaminate: the nanoscale size of the Mg crystals is comparable to molecular diffusion lengths, which enables near complete conversion to the metal hydride (99.5% of the theoretical value), and the interaction of the Mg nanocrystals with the rGO layers protects against invasion of oxygen while enabling rapid surface diffusion of hydrogen, which enhances kinetics. Indeed, rGO-Mg hydrogen absorption/desorption is faster than Mg-polymer composites containing nanocrystals of similar size (see FIGS. 11A and 11B). Consistent with previous studies, the diffusion of hydrogen atoms was facilitated by the interaction between Mg and carbon layers, enhancing both the hydrogen capacity and kinetics of Mg (see additional data in FIGS. 12A and 12B).

Cycle tests were performed at 250° C./350° C. for 5 cycles and at 200° C./300° C. for additional 20 cycles (see FIG. 7B). The capacity and kinetics were well-preserved during further cycles, though a slight decrease in the capacity was observed. Importantly, the Mg nanocrystal size and size distributions were well preserved after several absorption/desorption cycles without sintering or grain growth (see FIGS. 3 and 4). While bulk metal hydrides are susceptible to mechanical fracture and cracking due to the large volume expansion upon hydriding (ca. 33% from Mg to $MgH_2$), the high Young's modulus of rGO enables it to robustly encase the Mg nanocrystals during expansion/contraction events without fracture and prevent macroscale sintering.

All measurements were performed with one sample, and the obtained data were fit—the full absorbed fraction and 85% of the desorbed fraction were used—with the Johnson-Mehl-Avrami equation.

$$[-\ln(1-x)]^{1/n} = kt$$

where x is the fraction of Mg or $MgH_2$ hydrogenated or dehydrogenated, k is the reaction rate constant, t is time, and n is the reaction exponent. For the absorption measurement, the best linear behavior was acquired with n=0.79-0.89, though n=0.98-1.00 was obtained for the initial 60% of absorption fraction (Table 2), implying that nucleation and growth along one-dimension with the formation of rod-shaped $MgH_2$ occurs dominantly, while some irregular shape is produced in the late stage of adsorption, as deduced from the non-integer n values. The activation energy of absorption was calculated to be 60.8 kJ/mol with $R^2$=0.994. For the desorption measurement, however, a different behavior was observed at 300° C. Unlike 325° C. and 350° C., the curve shape changed upon approximately 1 wt % of $H_2$ desorption for 300° C. hence, the data at 300° C. was separated into two regions, before and after 1 wt % desorption (labeled as region i and ii, respectively, in the FIG. 9B(b) inset), for an accurate analysis. The best linear behavior was obtained with n=0.95 and 0.89 for 325° C. and 350° C. respectively, while n=3.5 and n=0.99 for 300° C., before (i) and after (ii) 1 wt % desorption, respectively, indicating the change of mechanism. Using the two different regimes, different activation energies were obtained: 165.1 kJ/mol ($R^2$=0.912) and 92.9 kJ/mol ($R^2$=0.983) respectively (See FIG. 9C). The curve fitting had a higher $R^2$ value when the data region with n=0.99 was used. It can be inferred that, at high temperatures, hydrogen is desorbed via rapid nucleation followed by one-dimensional growth, whereas at 300° C., slow nucleation occurs until 1 wt % of hydrogen is desorbed, followed by one-dimensional growth.

The hydrogen absorption/desorption properties of the nanolaminate were compared with Mg-PMMA which has similarly sized Mg nanocrystals encapsulated by poly(methyl methacrylate) (PMMA). Enhancements of both hydrogen capacity and sorption kinetics were observed, for the rGO-Mg multilaminates; clearly, the presence of the rGO-layers has a beneficial effect on sorption and desorption kinetics.

The amount of GO in the composite was varied in order to examine the effect of mass fraction of rGO on sorption behavior. Interestingly, relative to the reported abundance of rGO in the manuscript, both additional and less GO in the synthesis resulted in reduced hydrogen capacity and poorer kinetics. Based upon these results, we observe that the catalytic effect of rGO on sorption was diminished when less GO was used, while a larger amount of GO could hinder hydrogen diffusion into and out of the Mg nanocrystals by increasing the diffusion path length. Consequently, there exists an optimum weight percent range of GO for optimized performance of the nanolaminates, where rGO crucially prevents Mg nanocrystals from oxidization, while also enhancing the kinetics and maximizing hydrogen capacity.

Figure 13:
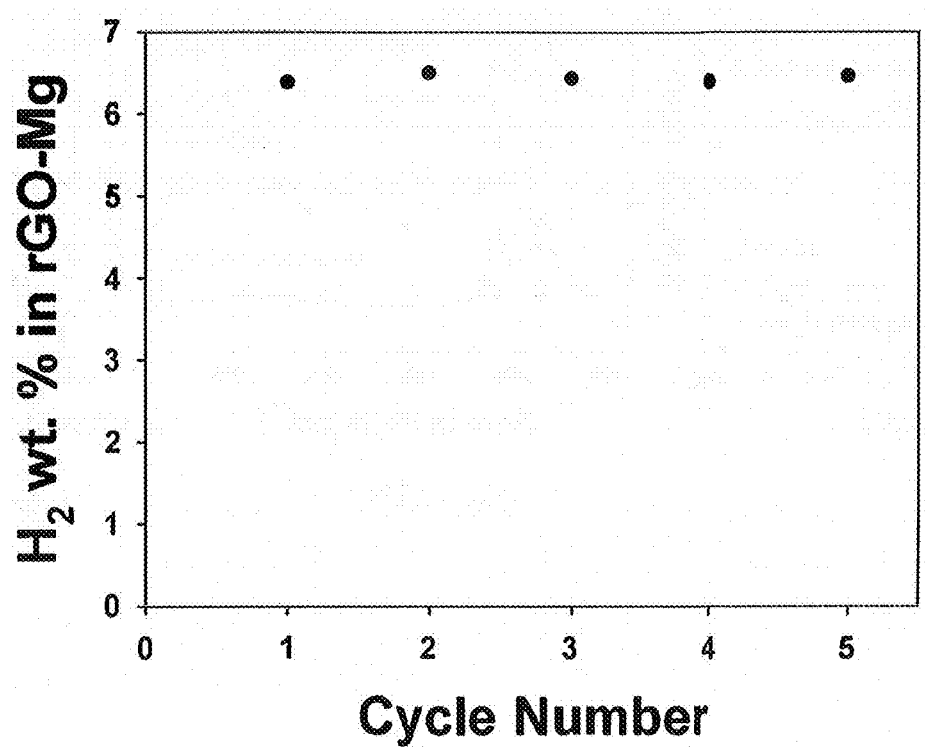
FIG. 13 illustrates hydrogen capacity during cycles after placed under an open vacuum.

FIG. 13 illustrates hydrogen capacity during cycles after placed under an open vacuum.

The desorption cycles were performed under a closed system in our experiments, leaving 0.3-0.4 wt % of the residual hydrogen; however, such residual hydrogen can be completely (>99%) dehydrided by evacuating the composite sample under an open vacuum for 30 minutes.

Figure 14A:
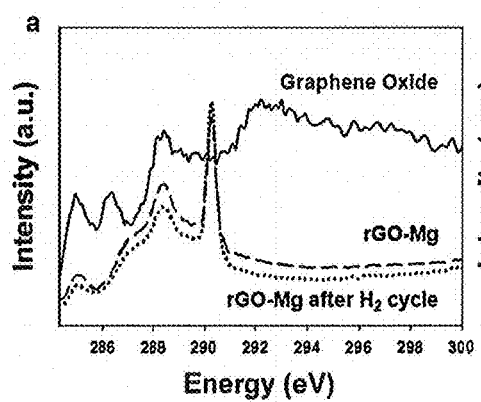
FIGS. 14A-14C illustrate XANES and Raman spectral analysis of GO and rGO-Mg multilarninates before and after hydrogen cycling.
Figure 14B:
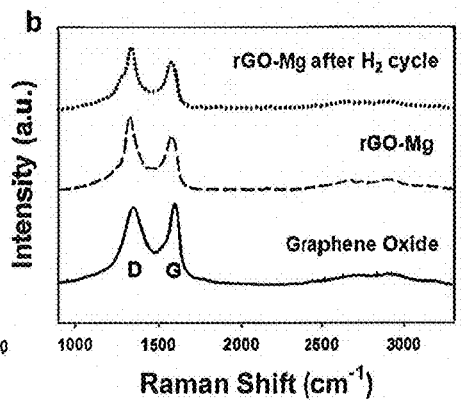
Figure 14C:
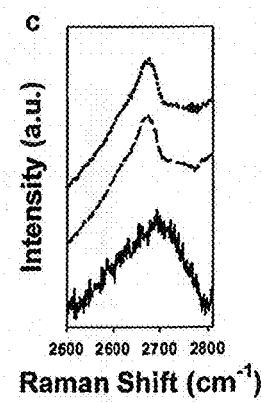
Figure 15A:
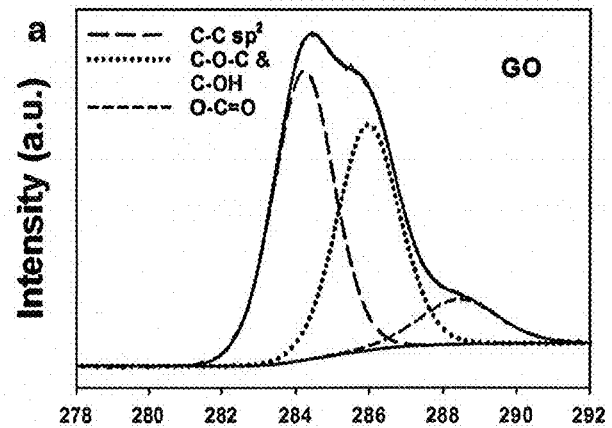
FIGS. 15A-15D illustrate XPS spectra of rGO-Mg after synthesis and after hydrogen cycling. XPS spectra (C 1s) of FIG. 15A GO, FIG. 15B rGO-Mg after synthesis, FIG. 15C rGO-Mg after $H_2$ cycling, FIG. 15D XPS pattern (Mg 2s) for rGO-Mg after synthesis and after $H_2$ cycling.
Figure 15B:
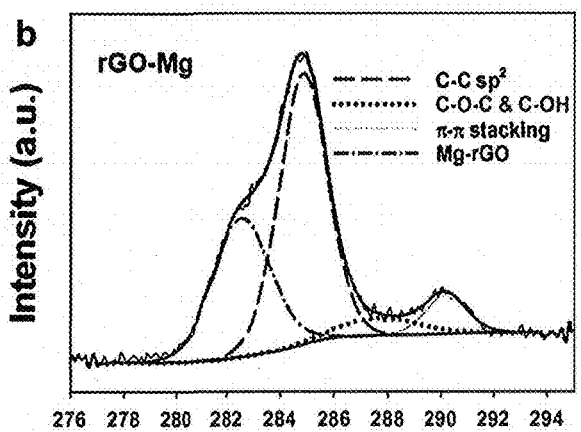
Figure 15C:
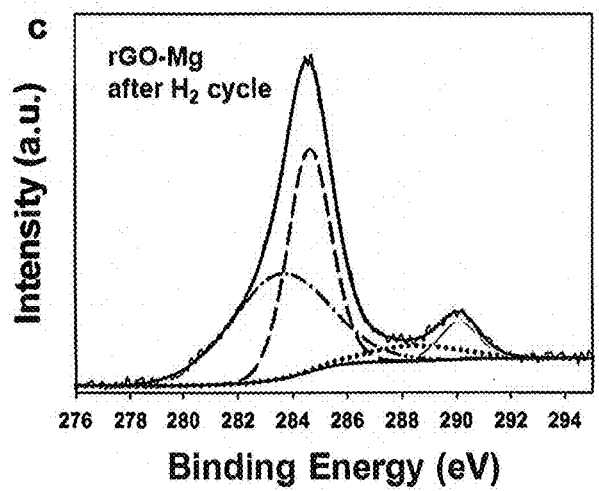
Figure 15D:
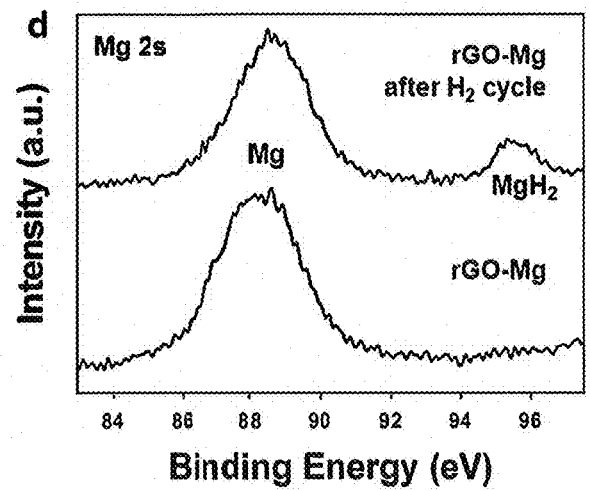

FIGS. 14A-14C illustrate XANES and Raman spectral analysis of GO and rGO-Mg multilaminates before and after hydrogen cycling. FIG. 14A illustrates XANES spectra of GO, rGO-Mg after synthesis and after cycling at carbon K-edge, FIG. 14B illustrates Raman spectra of GO, rGO-Mg after synthesis and after $H_2$ cycling, FIG. 14C illustrates the 2D peak region.

X-ray absorption near-edge structure (XANES) measurements were performed to probe the interactions between rGO and Mg nanocrystals (FIG. 3a). Compared to GO, increased intensity of the carbon K-edge at 288.4 eV and 290.3 eV were observed, corresponding to carbon atoms attached to oxygen or other oxygen-containing chemical species. From this we infer that the multilaminates are uniquely stabilized by the formation of interfacial Mg—O—C bonds forged during synthesis. We believe this to be the basis of the exceptional stability of these multilaminates. The structural evolution of GO during synthesis and hydrogen cycling was studied using Raman Spectroscopy (FIG. 3b, 3c). The intensity ratio of D and G peaks (I(D)/I(G)) increased after rGO-Mg synthesis, indicating that the average domain size of sp² hybridized regions was decreased as GO was reduced. The 2D peak, whose position and shape depends on the number of graphene layers, shifted to lower frequency (2701 cm$^{-1}$ to 2685 cm$^{-1}$) and its full width at half maximum (FWHM) also decreased upon the formation of rGO-Mg (FIG. 3c). This suggests that few, if any, isolated multi layers of rGO exist in the composite, and that most rGO layers are actively wrapping Mg nanocrystals. No change was observed in the Raman spectra of freshly synthesized rGO-Mg in comparison to samples studied after hydrogen cycling. Importantly, I(D)/I(G) ratios remained consistent as well (1.370 after synthesis and 1.337 after cycling), indicating that the defect density, a key attribute of rGO responsible for selective hydrogen transport, was well-maintained even after several hydrogen absorption and desorption cycles.

Additionally, the chemical environment of GO and rGO-Mg were investigated via X-ray photoelectron spectroscopy (XPS). FIGS. 15A-15D illustrate XPS spectra of rGO-Mg after synthesis and after hydrogen cycling. XPS spectra (C 1s) of FIG. 15A. GO, FIG. 15B rGO-Mg after synthesis, FIG. 15C rGO-Mg after H$_2$ cycling, FIG. 15D XPS pattern (Mg 2s) for rGO-Mg after synthesis and after H$_2$ cycling.

Peaks associated with oxygen-containing functional groups in the GO diminished after the formation of rGO-Mg, confirming reduction of GO. The rGO-Mg composite contained an additional peak at 282.5 eV, which is attributed to the interaction between carbon species and metal particles, corresponding to the interaction of rGO and Mg nanocrystals. Furthermore, a prominent π-π* stacking peak was observed at 290.1 eV, resulting from Mg nanocrystal wrapping which was also observed by TEM (see FIG. 3). In the Mg 2s spectrum, one additional peak appears in the higher energy region after hydrogen absorption, implying a new chemical state, consistent with MgH$_2$.

In conclusion, we have developed a facile method of preparing the densest possible loading of reactive nanocrystals safely into a composite material, a crucial step forward for enhancing the energy density of nanomaterials. As a result, our rGO-Mg multilaminates offer exceptional environmental stability and unsurpassed hydrogen storage capability, exceeding that offered by any other non-cryogenic reversible material. Indeed, we exceed 2020 DOE gravimetric—and ultimate full-fleet volumetric—targets for FCEVs. We believe that these results suggest the possibility of practical solid-state hydrogen storage and use in the near future. Furthermore, this work shows that atomically thin 2D materials can be used to simultaneously protect nanocrystals from ambient conditions while also imparting new functionality. Such stable mixed dimensional laminates of zero-valent nanocrystalline metals can be extended to a variety of additional applications, including batteries, catalysis, and energetic materials.

Methods

Synthesis of rGO-Mg nanocomposite: The composites of rGO-Mg were synthesized in an argon glove box. GO was ball-milled for 10 minutes before use, to break it down to GO platelets so that it can effectively make a complex with bis(cyclopentadienyl) magnesium (Cp$_2$Mg). To prepare the lithium naphthalenide solution, naphthalene (2.40 g, 0.0187 mol) was dissolved in 120 ml of THF, followed by the immediate addition of Li metal (0.36 g, 0.0253 mol), leading to a dark green solution. 6.25 mg of GO was dispersed in 12.5 ml of THF under Ar, sealed in a container, and sonicated for 1.5 hours. A Cp$_2$Mg solution (2.31 g, 0.015 mol, in 22.5 ml of THF) was added to GO solution afterwards, stirring for 30 min. The resulting GO/Cp$_2$Mg solution was added to the lithium naphthalenide solution and magnetically stirred for 2 hours. The product was centrifuged (10,000 rpm, 20 min) and washed with THF (10,000 rpm, 20 min) twice, followed by vacuum drying overnight.

Characterization and Instrumentation: High-resolution transmission electron microscopy was performed using JEOL 2100-F Field-Emission Analytical Transmission Electron operated at 120 kV and equipped with Oxford INCA energy dispersive electron x ray spectrometer and Tridiem Gatan imaging Filter and spectrometer. The powder samples were dispersed on lacy carbon grids from THF solutions. Elemental analysis of the EELS and EDS spectra was performed using Digital Micrograph software (Gatan Inc.) X-ray diffraction (XRD) patterns were acquired with a Bruker AXS D8 Discover GADDS X-Ray Diffractometer, using Cu Kα radiation (λ=0.154 nm). Hydrogen absorption/desorption measurement was performed, using a HyEnergy PCT Pro-2000 at 15/0 bar of H$_2$ at different temperatures. X-ray Absorption Near-Edge Structure Spectroscopy (XANES) was performed on Beamline 8.0.1.3 at the Advanced Light Source (ALS). The energy resolution at Carbon K-edge was set to 0.1 eV and the experimental chamber had a base pressure of at most 1×10−8 torr. A HOPG reference sample was measured before and after all XANES experiments for energy calibration. The XANES spectra were recorded using Total Electron Yield (TEY) and Total Fluorescence Yield (TFY) detection modes. The Raman spectra of GO and rGO-Mg samples were collected, using Horiba Jobin Yvon LabRAM ARAMIS automated scanning confocal Raman microscope with a 532 nm excitation source, and X-ray Photoelectron spectra were obtained via PHI 5400 X-ray Photoelectron Spectroscopy (XPS) System with Al Kα. The Mg content in the composite was determined by Inductively Coupled Plasma-Optical Emission Spectroscopy (ICP-OES) at ALS Life Sciences Division & Environmental.

The Scherrer Equation is used to determine the size of Mg nanocrystals based on XRD result, $$D = \frac{0.9\lambda}{\beta \cos\theta}$$

where D is the size of crystal, λ is the X-ray wavelength (0.154 nm), β is the full width at half maximum of the diffraction peak (FWHM), and θ is Bragg angle. Three major peaks were examined from three different syntheses. The average size determined from XRD is 14.76 nm (±1.92 nm). It is different from TEM analysis in which case the size is 3.26 nm (±0.87 nm) calculated from several random spots, and larger crystallites corresponding to 15 nm were not observed in TEM images.

TABLE 1

Determination of the average size of Mg nanocrystals in the composite using X-ray diffraction peaks.

| Batch # | Index | 2θ (degree) | β (degree) | Size (nm) |
|---|---|---|---|---|
| 1 | (100) | 32.15 | 0.49885 | 16.57 |
|   | (002) | 34.39 | 0.57451 | 14.47 |
|   | (101) | 36.57 | 0.54118 | 15.45 |
| 2 | (100) | 32.03 | 0.61335 | 13.47 |
|   | (002) | 34.22 | 0.65019 | 12.78 |
|   | (101) | 36.43 | 0.67452 | 12.39 |
| 3 | (100) | 32.19 | 0.48416 | 17.07 |
|   | (002) | 34.42 | 0.55813 | 14.90 |
|   | (101) | 36.60 | 0.53017 | 15.78 |

TABLE 2

The best n values in JMA fits with $R^2$ values

| | Absorption | | | Desorption | |
|---|---|---|---|---|---|
| | ~60% abs. | ~100% abs. | | | |
| 200° C. | 0.98 ($R^2$ = 0.999) | 0.89 ($R^2$ = 0.995) | 300° C. | 3.5 ($R^2$ = 0.983) | 0.99 ($R^2$ = 0.998) |
| 225° C. | 1.00 ($R^2$ = 0.998) | 0.88 ($R^2$ = 0.996) | 325° C. | 0.95 ($R^2$ = 0.990) | |
| 250° C. | 0.98 ($R^2$ = 0.998) | 0.79 ($R^2$ = 0.989) | 350° C. | 0.89 ($R^2$ = 0.999) | |

What is claimed is:

1. A composition of matter comprising:
a reduced graphene oxide (rGO)-magnesium (Mg) nanocrystal nanolaminate, the nanolaminate comprising two rGO sheets with Mg nanocrystals distributed therebetween, the nanolaminate having a hydrogen storage capacity of approximately 6.5 weight percent hydrogen and 0.105 kg $H_2$/L, the hydrogen storage capacity of the nanolaminate being equivalent to approximately 7.56 weight percent hydrogen in the Mg nanocrystals.

2. The composition of matter claim 1, wherein the Mg nanocrystals are distributed in an approximately hexagonal pattern corresponding to a d-spacing of 2.778 Å.

3. The composition of matter claim 2, wherein the Mg nanocrystals are distributed in an approximately hexagonal close-packed (hcp) pattern.

4. The composition of matter claim 3, wherein a Mg nanocrystal size distribution is approximately 3.26 nanometers ±0.87 nanometers in diameter.

5. The composition of matter claim 3, wherein at least 50% of the Mg nanocrystals are zero-valent crystalline Mg.

6. The composition of matter claim 1, wherein the nanolaminate further comprises hydrogen.

7. The composition of matter claim 1, wherein the nanolaminate further comprises hydrogen in the form of $MgH_2$.

8. A method of preparing reduced graphene oxide (rGO)-magnesium (Mg) nanocrystal nanolaminates comprising:
ball-milling graphene oxide (GO) to break down the GO to GO platelets in order to complex with bis(cyclopentadienyl) magnesium ($Cp_2Mg$);
preparing a lithium naphthalenide solution by dissolving naphthalene in tetrahydrofuran (THF), followed by the addition of Li metal to produce the lithium naphthalenide solution;
dispersing GO in the THF to form a GO solution;
adding a $Cp_2Mg$ solution to the GO solution to produce a GO/$Cp_2Mg$ solution;
adding the GO/$Cp_2Mg$ solution to the lithium naphthalenide solution to produce the reduced graphene oxide (rGO) magnesium (Mg) nanocrystal nanolaminates;
centrifuging and washing the reduced graphene oxide (rGO)-magnesium (Mg) nanocrystal nanolaminates with THF; and
drying the graphene oxide (rGO)-magnesium (Mg) nanocrystal nanolaminates a graphene oxide (rGO)-magnesium (Mg) nanocrystal nanolaminate comprising two rGO sheets with Mg nanocrystals distributed therebetween, the nanolaminate having a hydrogen storage capacity of approximately 6.5 weight percent hydrogen and 0.105 kg $H_2$/L, the hydrogen storage capacity of the nanolaminate being equivalent to approximately 7.56 weight percent hydrogen in the Mg nanocrystals.

* * * * *